A. SCHMILOWITZ.
COMBINED GAS HEATING AND COOKING STOVE.
APPLICATION FILED JUNE 22, 1920.
1,379,701. Patented May 31, 1921.
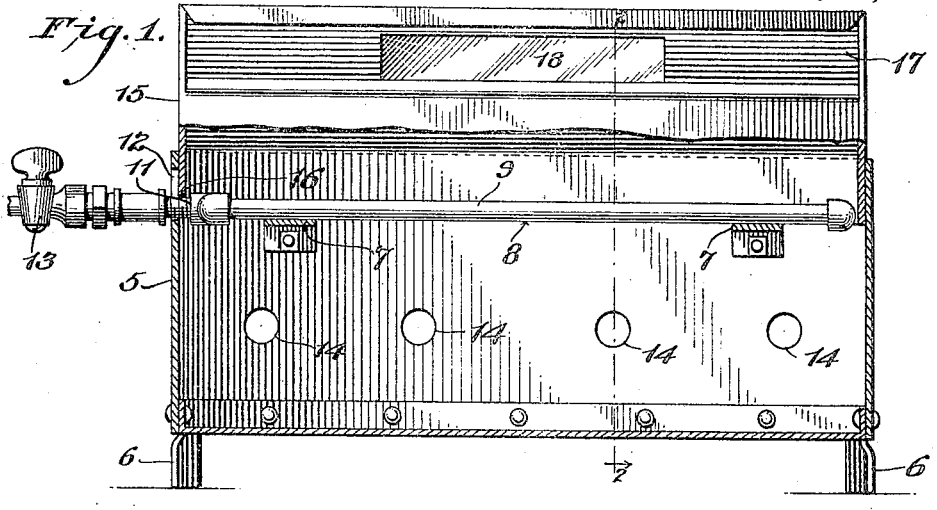
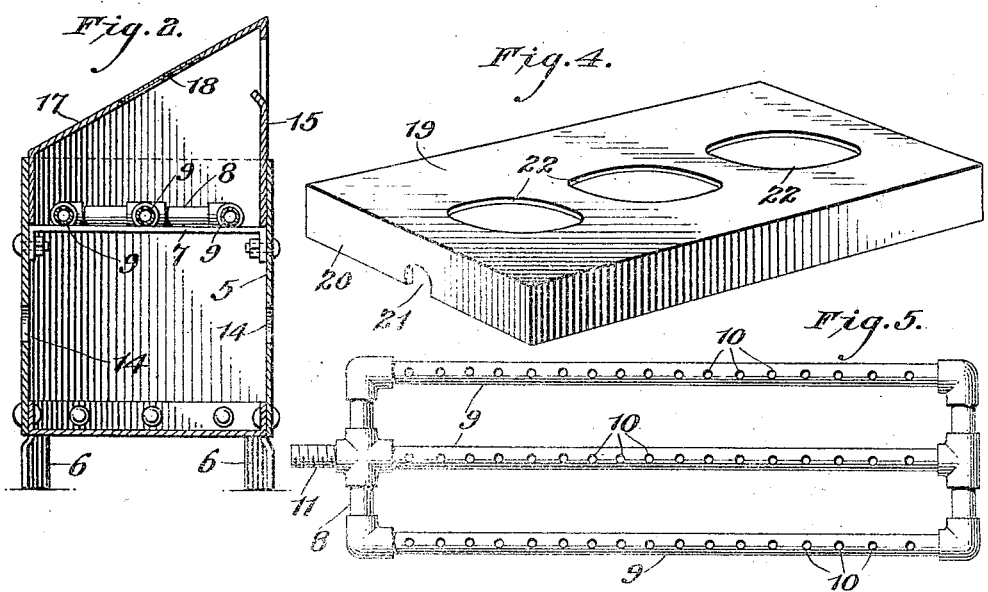
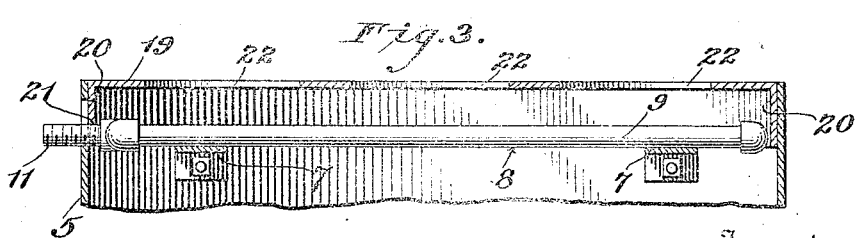
Inventor
Abraham Schmilowitz,
By Attorney
C. P. Goepel.

UNITED STATES PATENT OFFICE.

ABRAHAM SCHMILOWITZ, OF JERSEY CITY, NEW JERSEY.

COMBINED GAS HEATING AND COOKING STOVE.

1,379,701.   Specification of Letters Patent.   Patented May 31, 1921.

Application filed June 22, 1920. Serial No. 390,913.

*To all whom it may concern:*

Be it known that I, ABRAHAM SCHMILOWITZ, a citizen of the United States, and a resident of Jersey City, in the county of Hudson and State of New Jersey, have invented certain new and useful Improvements in Combined Gas Heating and Cooking Stoves, of which the following is a description.

This invention relates to a combined gas heating and cooking stove, and has for its primary object to provide a simple and inexpensive device of this character which can be easily and quickly converted for use either as a cooking range, or a heating stove.

In one embodiment of the invention I propose to provide a body casing with means for removably mounting a heating element in the upper portion of said casing, and interchangeable top members adapted to be arranged in the upper end of said casing, and frictionally coacting with the walls thereof, one of said top members constituting a heat deflecting hood, and the other member subserving the purpose of a stove top, having openings therein, over which the cooking utensils may be placed.

It is another and more particular object of the invention to provide the body or casing of the heater with spaced transverse bars arranged therein, and secured to the opposite side walls of the casing, upon which various types of gas heating elements may be interchangeably positioned, and the removable top member having means coacting with the heating element to hold the same against a transverse shifting movement on the supporting bars.

With the above and other objects in view, the invention consists in the improved construction, combination and relative arrangement of the several parts as will be hereinafter more fully described, illustrated in the accompanying drawings, and subsequently incorporated in the subjoined claims.

In the drawings, wherein I have described one preferred embodiment of my invention, and in which similar reference characters designate corresponding parts throughout the several views:

Figure 1 is a vertical longitudinal sectional view, showing the device arranged for use as a heater.

Fig. 2 is a transverse section taken on the line 2—2 of Fig. 1.

Fig. 3 is a fragmentary vertical section showing the device when converted for use as a cooking range.

Fig. 4 is a perspective view of the top plate shown in Fig. 3, and,

Fig. 5 is a plan view of the heating element.

Referring in detail to the drawings, 5 designates a body or casing, which is formed of sheet metal of suitable gage, and is provided at its corners with the supporting feet 6, preferably of sheet metal, which are suitably riveted to the walls of the casing.

The upper end of the casing 5 is open, and adjacent to this upper open end of the casing, the transverse bars 7 are arranged therein, and riveted or bolted at their ends to the opposite side walls of the casing. Upon these spaced transverse bars the heater element generally indicated at 8 is adapted to be removably positioned. This heater element in one embodiment, may consist of a plurality of longitudinal pipes 9, suitably coupled to each other at their opposite ends, and each having longitudinally spaced jet openings 10 in the upper side thereof. At one end the heater element is provided with a nipple 11, which is adapted to extend through an opening 12 in one end wall of the casing 5. To this nipple the gas supply cock 13 is coupled, and is adapted to be connected by means of a length of tubing to the main supply pipe in the room or apartment. The opposite side walls of the casing 5 are provided with spaced air inlet openings, indicated at 14. When the device is to be used as a heater, the hood 15 is arranged in position with its side and end walls extending within the upper open end of the casing 5, and frictionally contacting with the corresponding walls thereof. The side walls of this hood engaged at their lower ends rest upon the supporting bars 7, and one end wall thereof is provided with a notch or recess 16, to embrace the nipple 11. Thus it will be seen that this end wall of the hood coacting with the nipple 11, holds the heater element 8 against a transverse shifting movement on the supporting bars 7. The hood 15 is provided with an upwardly and forwardly inclined rear wall 17, in which a transparent pane 18, of isinglass, or other suitable material, is inserted, so that the flame issuing from the jet openings 10 of the heating element may be readily observed. The inclined top wall 17, of the hood, deflects the rising heat forwardly and upwardly through the front open side of the hood and into the apartment. The corners or edges of the heater casing, and of the hood 15 may be suitably reinforced and ornamented in any preferred manner, as for instance, by attaching thereto strips of brass or nickel.

In Fig. 3 of the drawings, I have shown the device arranged for use as a cook stove, wherein a top plate 19 is substituted for the hood 15, said top plate having a marginal flange 20 extending downwardly into the upper end of the casing and frictionally engaging the walls thereof. One end flange on said plate is notched, as at 21, to receive the nipple of the heater element, and said plate is provided with spaced openings 22. Over these openings the pots or other cooking vessels may be arranged, and the flame jets from the heater element will contact directly with the bottom walls of the vessels, thus quickly cooking the food stuffs contained therein.

In the foregoing description I have disclosed one form of the heater element 8, but it is, of course, manifest that various other forms of such heaters might be interchangeably used. For instance, in my copending application for patent on an improved gas heater and toaster Serial No. 390,914, I have shown and described another heater element in the form of a shallow pan having a top wall provided with a multiplicity of flame jet openings. Such a heater might be substituted for the heater element herein referred to.

From the foregoing it will be seen that I have produced a very simple device, which can be serviceably employed as a heating and cooking stove. The article can also be manufactured and sold at nominal cost, and is light in weight, so that it can be easily moved from place to place.

While I have herein shown and described a preferred and satisfactory embodiment of my invention, it is, nevertheless, to be understood that the device is susceptible of embodiment in numerous other alternative forms, and I, therefore, reserve the privilege of adopting all such legitimate changes as may be fairly embodied within the spirit and scope of the invention as claimed.

I claim:

1. A device of the character described comprising a casing, means for removably supporting a heater element in the upper end of said casing, and interchangeable removable top members adapted to be inserted within the upper end of the casing, whereby the device may be converted for use either as a heater or cooking range, each of said top members having means coacting with the heater element to hold the same against transverse shifting movement on the support.

2. A device of the character described comprising a casing open at its upper end, spaced transverse supporting bars fixed in the upper open end of the casing, a heater element adapted to be removably positioned upon said bars, one end wall of the casing having an opening therein, and the heater element being provided with a nipple to extend through said opening, interchangeable top members adapted to be inserted within the upper end of the casing, and frictionally coacting with the walls thereof, whereby the device may be converted for use either as a heater or cooking range, said members adapted to rest upon the supporting bars for the heater element, and each of said members having a recess in one end wall thereof to receive the nipple of the heater element and hold the latter against transverse shifting movement on the supporting bars.

In testimony that I claim the foregoing as my invention, I have signed my name hereunder.

ABRAHAM SCHMILOWITZ.